United States Patent Office 3,773,935
Patented Nov. 20, 1973

3,773,935
4-AZOSULFONAMIDES AS ANTHELMINTICS FOR TREATING LIVER FLUKE
Helmut H. Mrozik, Matawan, N.J., assignor to Merck & Co., Inc., Rahway, N.J.
No Drawing. Filed Apr. 19, 1971, Ser. No. 135,507
Int. Cl. A61k 27/00
U.S. Cl. 424—226     8 Claims

ABSTRACT OF THE DISCLOSURE 4-(heterocyclicazo)-benzenesulfonamides are employed in the treatment of both mature and immature liver fluke infections. They are preferably orally administered to host animals in suitable compositions, although parenteral administration is also suitable.

SUMMARY OF THE INVENTION

This invention is concerned with a novel method for the treatment of liver fluke infection of both the mature and immature varieties. More particularly it is concerned with the use of 4-azobenzene sulfonamides variously substituted at the 3 and 5 positions and substituted at the 4 position with a heterocyclic aromatic diazo group. This invention is also concerned with compositions containing said 4-azobenzene sulfonamides for administration to animals infected with mature or immature liver fluke. Further aspects of this invention will become apparent on reading the complete disclosure.

DESCRIPTION OF THE PRIOR ART

Many sulfonamides, especially benzene sulfonamide compounds, have been known in the art for many years. They have generally been prepared and studied for their activity as antibacterial agents and much data are published concerning the bacterostatic activity of sulfonamide compounds. Sulfonamides have not, however, received extensive study as anthelmintic agents, and have not been described heretofore as having any value in combatting liver fluke.

DESCRIPTION OF THE INVENTION

The compounds which, according to this invention, are useful for the treatment of mature and immature liver fluke are represented by the following structural formula:

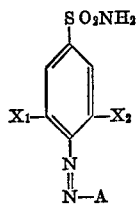

wherein $X_1$ and $X_2$ are each halogen and A is the heterocyclic group pyridyl, pyrimidyl, or quinazolinyl which may be optionally substituted with from 1 to 3 of the substituent groups amino, hydroxyl or mercapto.

When in the instant application reference is made to "halo" or "halogen," the term is deemed to include fluorine, bromine, chlorine, or iodine.

PREFERRED EMBODIMENTS OF THE INVENTION

The preferred embodiments of the invention are realized when $X_1$ and $X_2$ are both bromine atoms. Compounds exemplary of the preferred embodiments of the invention are:

4-(2,4,6-triamino-5-pyrimidinylazo)-3,5-dibromo-
  benzenesulfonamide
4-(4-amino-6-hydroxy-2-mercapto-5-pyrimidinylazo)-
  3,5-dibromobenzenesulfonamide
4-(2,6-diamino-3-pyridylazo)-3,5-dibromobenzene-
  sulfonamide
3,5-dibromo-4-(8-hydroxy-5-quinolinylazo)-benzene-
  sulfonamide The compounds of the present invention have utility in the field of animal therapy. They are effective anthelmintics and are especially effective against both mature and immature liver fluke of the species *Fasciola gigantica* and *Fasciola hepatica*, the common liver fluke in sheep and cattle. The preferred dosage levels depend on the type of compound to be employed, the type of animal to be treated, the particular helminth to be combatted, and the severity of the helminthic infestation. In general, effective fluke eradication is achieved when the compounds are administered in a single oral dose at dosage levels of from about 1 to 300 mg./kg. of animal body weight and preferably from about 10 to 100 mg./kg. of animal body weight. The compounds of the present invention may be administered in a variety of ways depending upon the particular animal employed, the type of anthelmintic treatment normally given to such animal, the materials employed and the particular helminths being combatted. It is preferred to administer them in anthelmintically effective amounts in a single or divided oral or parenteral, most preferably oral, dose at a time when fluke infection is apparent or suspected in the animal.

In addition to the inactive ingredients in the composition, said composition may contain one or more other active ingredients which may be selected from the compounds described by Formula I or from other known anthelmintic agents. Beneficial results are obtained when the compounds of Formula I are combined with an anthelmintic agent such as 2-(4-thiazolyl)benzimidazole (thiabendazole) or tetramisole (dl - 2,3,5,6 - tetrahydro-6-phenylimidazo[2,1-b]thiazole) known anthelmintic agents.

In general, compositions containing the active anthelmintic compound are employed. The amounts of the anthelmintic ingredient in the composition as well as the remaining constituents vary according to the type of treatment to be employed, the host animal and the particular helmintic infestation being treated. In general, however, compositions suitable for oral administration, containing a total weight percent of the active compound or compounds ranging from 0.1 to 95% will be suitable with the remainder of the compositions being any suitable carrier or vehicle. A number of modes of treatment may be employed and each to some extent determines the general nature of the composition. For example, the anthelmintic compounds may be administered to domesticated animals in a unitary oral dosage form such as a tablet, bolus, capsule, or drench; a liquid oil base form suitable for parenteral administration, or they may be compounded as a feed premix to be later admixed with the animals food. When the compositions are to be solid unit dosage forms as in tablets, capsules or boluses, the ingredients other than the active compounds may be any other non-toxic vehicle convenient in the preparation of such forms and preferably materials nutritionally suitable such as starch, lactose, talc, magnesium stearate, vegetable gums and the like. Moreover, when capsules are employed, the active compound may be used in essentially undiluted form, the only extraneous material being that of the capsule casing itself which may be hard or soft gelatin or any other orally acceptable encapsulating material. When the dosage form is to be used for parenteral administration the active material is suitably admixed with an acceptable oil base vehicle preferably of the vegetable oil variety such as peanut oil, cotton seed oil and the like. In all such forms, that is, in tablets, boluses, capsules and oil base formulations, the active compound conveniently ranges from about 5 to 80% by weight of the total composition.

When the unit dosage form is to be in the form of a drench, the anthelmintic agents may be mixed with agents which will aid in the subsequent suspending of the active compounds in water such as bentonite, clays, water soluble starches, cellulose derivatives, gums, surface active agents and the like to form a dry pre-drench composition, and this pre-drench composition is added to water just before use. In the pre-drench formulation, in addition to the suspending agent, such ingredients as preservatives, anti-foam compounds or other suitable diluents or solvents may be employed. Such a dry product may contain as much as 95% by weight of the active compound, the rest being excipient. Preferably, the solid composition contains from 30 to 95% by weight of the active compound. Enough water should be added to the solid product to provide the proper dosage level with a convenient amount of liquid for a single oral dose. The commonly used measure in the field is 1 fluid ounce of material and thus that 1 fluid ounce of material should contain enough of the anthelmintic compound to provide an effective dosage level. Liquid drench formulations containing from 10 to 50% by weight of dry ingredients will in general be suitable with a preferred range being from 15 to 25 weight percent.

When the compositions are intended to be used in feeds, feed supplements or feed premixes, they will be mixed with suitable ingredients of the animals nutrient ration. Solid orally ingestible carriers normaly used for such purposes as distillers dried grains, corn meal, citrus meal, fermentation residues, ground oyster shells, attapulgus clay, wheat shorts, molasses solubles, corn cob meal, vegetable substances, toasted dehulled soya flour, soya bean meal feed, antibiotic mycellia, soya grits, crushed limestone and the like are all suitable. The active compounds are intimately dispersed or admixed throughout the active solid carrier by methods such as grinding, melting, or tumbling. By selecting a proper diluent and by altering the ratio of carrier to active ingredient, compositions of any desired concentration may be prepared. Feed supplement formulations containing from about 10 to 30% of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of animal ration. Although the preferred level in feeds will depend on the particular compounds being employed, the active compounds of this invention are normally fed at levels of 0.01 to 3%. As stated above, animals are preferably treated at a time when the infestation is apparent or suspected and the most preferred method of such treatment is with oral doses. Thus, administration of medicated feed is not preferred but may be employed. Similarly, the amounts of drug present in the feed may be reduced to levels in the order of 0.01% to 0.5% by weight, based on the weight of the feed and the medicated feed administered over prolonged periods.

This could be in the nature of a preventive or prophylactic measure. Another method of administering the compounds of this onvention to animals whose feeds are conveniently pelleted such as sheep is to incorporate them directly into the pellets. For instance, the anthelmintic compounds are readily incorporated in the nutritionally adequate alfafa pellets at levels of 2 to 10 g. per pound for therapeutic use and lower levels for prophylactic use, and such pellets fed to the animals.

Examples of compositions suitable for administration to animals are:

A typical bolus composition is as follows:

| | G. |
|---|---|
| 4-(2,4,6-triamino-5-pyrimidinylazo)-3,5-dibromo-benzenesulfonamide | 6.0 |
| Dicalcium phosphate | 1.0 |
| Starch | 0.7 |
| Guar gum | 0.16 |
| Talc | 0.11 |
| Magnesium stearate | 0.028 |

A typical drench composition is as follows:

| | | |
|---|---|---|
| 4-(4-amino-6-hydroxy-2-mercapto-5-pyrimidinylazo)-3,5-dibromobenzenesulfonamide | g | 4.5 |
| Benzalkonium chloride | ml | 0.6 |
| Antifoam emulsion | g | 0.06 |
| Hydroxyethyl cellulose | g | 0.3 |
| Sodium phosphate | ml | 0.3 |
| Water, q.s. to 30 ml. | | |

Examples of typical feed premix supplements are as follows:

(A)

| | Lbs. |
|---|---|
| 4-(2,6-diamino-3-pyridylazo)-3,5-dibromobenzene sulfonamide | 5 |
| Wheat shorts | 95 |

(B)

| | Lbs. |
|---|---|
| 3,5-dibromo-4-(8-hydroxy-5-quinazolinylazo)-benzene sulfonamide | 15 |
| Ground oyster shells | 40 |
| Citrus meal | 45 |

The above feed premix supplements are combined with the animals' regular feed, intimately mixing therewith, such that the final concentration of the active ingredient is from 0.01 to 3% by weight.

The compounds of the instant invention are prepared by a diazotization reaction outlined in the following reaction scheme:

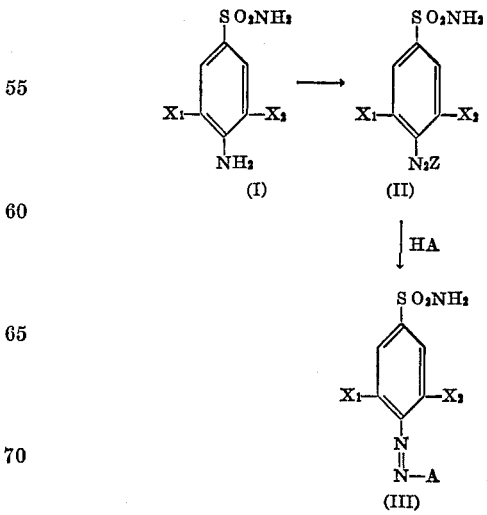

wherein $X_1$, $X_2$, and A are as previously defined, and Z is the anion of the acid used in the diazotization step;

sulfuric, phosphoric, nitric and hydrochloric acids have been employed with hydrochloric acid being preferred. Thus the diazonium chloride is the preferred intermediate (II).

The diazotization step (I→II) is carried out at from 0–5° C. using an alkali metal nitrite usually sodium nitrite and one of the aforementioned acids usually hydrochloric acid. The diazonium salt being unstable is generally not isolated but used in solution or suspension form in situ.

The solution or suspension of the diazonium salt is reacted with the heterocyclic aromatic compound at a temperature of from 0 to 50° C. in the presence of added base such as an alkali metal hydroxide, sodium acetate or trisodium phosphate to aid in the coupling of the diazo group to the aromatic heterocyclic nucleus. The reaction is usually complete in from 10 minutes to 2 hours and the product is then isolated by techniques known to those skilled in the art.

The following examples are typical of the procedure employed to synthesize the compounds of the invention. The examples are presented so that the invention might be more fully understood; they should not be construed as being limitative of the invention.

EXAMPLE 1

4-(2,4,6-triamino-5-pyrimidinylazo)-3,5-dibromobenzene sulfonamide 6.6 g. (0.02 mole) of 4-amino-3,5-dibromobenzene sulfonamide is suspended in 30 ml. of concentrated hydrochloric acid and the resultant suspension cooled to 0° C. A solution of 1.4 g. of sodium nitrite in 4 ml. of water is added dropwise to the sulfonamide solution, maintaining the temperature at from 0–5° C. The mixture is then treated dropwise with 20 ml. of 85% phosphoric acid, maintaining the temperature at from 0–5° C. The suspension is stirred for ½ hour and poured onto 300 ml. of an ice water mixture. The mixture is filtered to remove trace amounts of an insoluble material and treated with approximately 10 g. of urea to destroy any excess nitrous acid present, maintaining the temperature at 0–5° C. To this diazonium solution is added 2.50 g. (0.02 mole) of 2,4,6-triaminopyrimidine in 10 ml. of 2.5 N of hydrochloric acid. The temperature is maintained at from 0–10° C. solid sodium acetate is added until the pH of the resultant solution reaches from 5 to 6. The solution is stirred at room temperature for 1 hour and the precipitate is filtered, washed with water and recrystalized from ethanol affording 4-(2,4,6-triamin-5-pyrimidinylazo)-3,5-dibromobenzenesulfonamide.

When in the above procedure 4-amino-6-hydroxy-2-mercaptopyrimidine or 2,6-diaminopyridine is employed in place of 2,4,6-triaminopyrimidine there is obtained 4-(4-amino-6-hydroxy-2-mercapto-5-pyrimidinylazo)-3,5-dibromobenzene sulfonamide, and 4-(2,6-diamino-3-pyridylazo)-3,5-dibromobenzene sulfonamide, respectively.

EXAMPLE 2

3,5-dibromo-4-(8-hydroxy-5-quinolinylazo)-benzenesulfonamide

The diazonium salt of 4-amino-3,5-dibromobenzene sulfonamide is prepared as described in Example 1 using identical quantities of materials. The diazonium salt solution is filtered and added in one portion with vigorous stirring to a solution of 2.90 g. (0.02 mole) of 8-hydroxyquinoline 2.0 g. (0.05 mole) of sodium hydroxide, and 19.0 g. (0.05 mole) of crystalline sodium phosphate in 400 ml. of water at 5° C. The mixture is stirred vigorously for 5 minutes at 5° C. and the temperature raised to 30° C. and stirred for 1 hour. The solid precipitate is filtered, washed with water, then washed with ethanol, and dried affording 3,5-dibromo-4-(8-hydroxy - 5 - quinolinylazo)-benzenesulfonamide.

What is claimed is:

1. A method for the treatment of mature and immature liver fluke of sheep or cattle which comprises administering to said animal infected with mature or immature liver fluke an effective amount of a compound having the formula

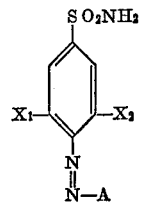

wherein $X_1$ and $X_2$ are each halogen and A is the heterocyclic group pyridyl, pyrimidyl, or quinazolinyl optionally substituted with from 1 to 3 of the substituent groups amino, hydroxyl, or mercapto.

2. The method of claim 1 in which $X_1$ and $X_2$ are each bromine.

3. The method of claim 1 in which A is the group 2,4,6-triamino-5-pyrimidinyl.

4. The method of claim 1 in which A is the group 4-amino-6-hydroxy-2-mercapto-5-pyridyl.

5. The method of claim 1 in which A is the group 2,6-diamino-3-pyrimidinyl.

6. The method of claim 1 in which A is the group 8-hydroxy-5-quinolinyl.

7. The method of claim 1 in which the compound is orally administered in an amount of from 1–300 mg./kg. of animal body weight.

8. The method of claim 7 in which the compound is orally administered in an amount of from 10–100 mg./kg. of animal body weight.

References Cited

Takeda: Chem. Abst., vol. 54 (1960), p. 8868a.
Mangini: Chem. Abst., vol. 37 (1943), p. 98 [1].
Mangini et al.: Chem. Abst., vol. 37 (1943), p. 4465 [1].
Mietzsch et al.: Chem. Abst., vol. 33 (1939), p. 4381 [8].
Northey: The Sulfonamides & Allied Compounds (1948), pp. 49 & 141.

SAM ROSEN, Primary Examiner